(12) United States Patent  (10) Patent No.: US 7,784,150 B2
Anderson et al.  (45) Date of Patent: Aug. 31, 2010

(54) RAILROAD CAR DOOR PIVOT ASSEMBLY

(75) Inventors: John D. Anderson, Aurora, IL (US);
Walter J. Peach, Montgomery, IL (US)

(73) Assignee: Standard Car Truck Company, Park Ridge, IL (US)

( * ) Notice: Subject to any disclaimer, the term of this patent is extended or adjusted under 35 U.S.C. 154(b) by 302 days.

(21) Appl. No.: 12/050,636

(22) Filed: Mar. 18, 2008

(65) Prior Publication Data

US 2009/0064454 A1  Mar. 12, 2009

Related U.S. Application Data

(60) Provisional application No. 60/910,489, filed on Apr. 6, 2007.

(51) Int. Cl.
*F16L 5/00* (2006.01)
(52) U.S. Cl. .................... 16/2.1; 105/355; 105/378; 49/40
(58) Field of Classification Search ............ 16/2.1, 16/223; 105/355, 404, 378; 410/4; 49/40, 49/41, 197, 385, 402
See application file for complete search history.

(56) References Cited

U.S. PATENT DOCUMENTS

| | | |
|---|---|---|
| 1,910,102 A | 5/1933 | Godfrey |
| 2,231,188 A | 2/1941 | Iarrobino |
| 3,058,791 A | 10/1962 | Stallman |
| 3,193,335 A | 7/1965 | Wing |
| 3,424,503 A | 1/1969 | Schulz |
| 3,546,735 A | 12/1970 | Liautaud |
| 3,587,477 A | 6/1971 | Ferris et al. |
| 3,944,298 A | 3/1976 | Cannon |
| 3,995,563 A | 12/1976 | Blunden |
| 4,007,330 A | 2/1977 | Winters |
| 4,085,983 A | 4/1978 | Johnson |
| 4,116,135 A | 9/1978 | Jackle et al. |
| 4,318,349 A | 3/1982 | Galasan |
| 4,437,410 A | 3/1984 | Stoller, Jr. et al. |
| 4,461,160 A | 7/1984 | Van Gompel |
| 4,917,021 A | 4/1990 | Murphy |
| 4,924,779 A | 5/1990 | Curtis et al. |
| 4,924,780 A | 5/1990 | Hart |
| 4,936,227 A | 6/1990 | Baker et al. |
| 5,486,079 A | 1/1996 | Martin et al. |
| 5,520,466 A | 5/1996 | Everitt et al. |
| 5,765,486 A | 6/1998 | Black, Jr. et al. |
| 5,782,187 A | 7/1998 | Black, Jr. et al. |
| 5,787,816 A | 8/1998 | Dworakowski et al. |
| 5,908,001 A | 6/1999 | Burke et al. |
| 6,136,240 A | 10/2000 | Burke et al. |
| 6,142,082 A | 11/2000 | Burke et al. |
| 6,289,822 B1 | 9/2001 | Black, Jr. et al. |

(Continued)

*Primary Examiner*—William L. Miller
(74) *Attorney, Agent, or Firm*—K&L Gates LLP

(57) ABSTRACT

An improved auto-rack railroad car door pivot bolt assembly for an auto-rack railroad car including a roof having a roof stiffener and a door having a hood. The auto-rack railroad car door pivot bolt assembly ties the hood of the door of the auto-rack railroad car to the roof stiffener on the roof of the auto-rack railroad car to reduce relative movement of the hood and the roof stiffener to each other and prevents wear of the shoulder bolt, the hood, and the roof stiffener.

14 Claims, 16 Drawing Sheets

U.S. PATENT DOCUMENTS

| | | |
|---|---|---|
| 6,339,994 B1 | 1/2002 | Kaplan et al. |
| 6,527,311 B1 | 3/2003 | Burke et al. |
| 6,708,625 B1 | 3/2004 | Burke et al. |
| 6,786,160 B1 | 9/2004 | Peach et al. |
| 6,845,722 B2 * | 1/2005 | Forbes ................. 105/355 |
| 6,964,233 B2 | 11/2005 | Peach et al. |
| 7,182,569 B2 | 2/2007 | Wrobley et al. |
| 2001/0014254 A1 | 8/2001 | Albritton |
| 2001/0035108 A1 | 11/2001 | Klag |
| 2001/0035109 A1 | 11/2001 | Black, Jr. et al. |
| 2002/0035948 A1 | 3/2002 | Schorr et al. |
| 2002/0127078 A1 | 9/2002 | Schorr et al. |
| 2003/0221582 A1 | 12/2003 | Burke et al. |

\* cited by examiner

RAILROAD CAR DOOR PIVOT ASSEMBLY

PRIORITY CLAIM

This application is a non-provisional application of, claims priority to, and the benefit of U.S. Provisional Patent Application Ser. No. 60/910,489, filed Apr. 6, 2007, the entire contents of which are incorporated herein.

DESCRIPTION

The present disclosure relates in general to a railroad car door pivot assembly, and in particular to an auto-rack railroad car door pivot bolt assembly.

BACKGROUND

The railroad industry employs a variety of freight railroad cars for transporting products. Many of these freight railroad cars such as box railroad cars and auto-rack railroad cars are enclosed to protect the products or vehicles being transported. These enclosed railroad cars typically include one or more sliding doors to provide access to the interior of these railroad cars. Many of these doors include hoods which are attached to the top or roof of the railroad cars by attachment assemblies such as pivot bolt assemblies for doors. As further described below, certain of these attachment assemblies tend to relatively quickly wear out and cause the doors to not work as intended or to malfunction.

Auto-rack railroad cars which transport newly manufactured vehicles such as automobiles, vans and trucks provide a prime example of this problem. Auto-rack railroad cars, referred to in the railroad industry as auto-rack cars, typically are compartmented, having two or three floors, a frame, two side walls, a roof, and a pair of doors at each end. The doors at each end protect the auto-rack car from illegal or unauthorized entry and thus prevent theft or vandalism of the vehicles being transported. The doors also prevent moving or flying objects from entering the auto-rack car and damaging the vehicles being transported. When unlocked, the doors are configured to be easily and quickly moved between closed and open positions to provide access to the vehicles in the auto-rack car. Examples of such auto-rack cars and the doors for auto-rack cars are generally illustrated in U.S. Pat. Nos. 3,995,563; 4,077,330; 4,917,021; 5,765,486; and 6,289,822. Auto-rack cars often travel thousands of miles through varying terrain. The movement of auto-rack cars causes movement and/or vibration of the individual components of the auto-rack cars including the roof and the doors. This movement and/or vibration causes substantial wear on certain components of the auto-rack cars including the known pivot bolt assemblies, the roof of the auto-rack cars and the hood of the doors of the auto-rack cars as discussed in more detail below.

FIGS. 1 and 2 generally illustrate a bi-level auto-rack car 20 including a frame 22 supported by trucks 24, each of which have several wheels 26 configured to roll along railroad tracks 28. The frame supports two side walls 30 and 32 and a roof 34. The auto-rack car 20 includes a pair of co-acting clamshell doors 36 and 38 mounted on each end of the auto-rack car. These doors are opened to facilitate the loading and unloading of vehicles into and out of the auto-rack car. Each of the end doors includes a substantially vertical panel 40 which extends from the floor to the roof and a pair of rollers (not shown) attached to the bottom of the panel for movably supporting the door. The top portions 42 and 44 of each of the doors are respectively pivotally connected to the roof by pivot bolt assemblies 46 and 48. Each pivot bolt assembly limits radial displacement of the door relative to its center of rotation. Each pivot bolt assembly also limits outward movement of the upper part of the door. The end doors are typically made of steel. The top portion of each end door typically includes a substantially solid rigid steel plate which is riveted, bolted, welded, or otherwise fastened to the vertical main portion of the door. This steel plate is sometimes referred to in the industry as a hood.

More specifically, one known and widely commercially used pivot bolt assembly for auto-rack cars is illustrated in FIGS. 3 to 7. This pivot bolt assembly 50 includes: (a) a non-metallic bushing or ball socket 52 configured to be positioned in the socket or indentation 41 formed in the hood 42 of the door; (b) a non-metallic cup liner 54 configured to be positioned in the roof stiffener 35 on the roof 34; (c) a shoulder bolt 56 configured to extend through the ball socket 52, the hood 42, the cup liner 54, the roof stiffener 35, and the roof 34; (d) two wave washers 58a and 58b positioned on the shoulder bolt 56; and (e) a nut 60 attachable to the shoulder bolt 56. Such known shoulder bolts tend to wear out at two specific locations along its shaft. The first wear location is at or about the plane of the hood and the second wear location is at or about the plane of the roof stiffener.

When the current pivot bolt assembly, and specifically the shaft of the shoulder bolt is subjected to enough wear, the shoulder bolt can break. If the shoulder bolt breaks, the top of the door can become disconnected from the roof. In such case, the door may not move because the top and bottom door locks hold the door in place. However, once the door locks are disengaged to operate the door, the door can fall off the end of the railroad car and cause damage or injury. Additionally, when the shoulder bolts are worn, the worn shoulder bolts can cause the door to not function as desired or to malfunction. The worn shoulder bolts can also cause damage to the door, the hood of the door, the roof or the roof stiffener, and other components of the auto-rack car. The cup liners of the pivot bolt assemblies have also been known to wear out.

The hood is also subject to wear, and specifically, the area which defines the hole in the hood is subject to a substantial amount of wear. In many auto-rack cars, the hole in the hood is originally a one-half inch diameter. This hole becomes larger due to the wear caused by movement of the current pivot bolt assembly. In certain cases, this hole has become as large as two inches and the entire pivot bolt assembly can fall through the hood. When this occurs, the hood of the door needs to be completely replaced, which is time consuming and expensive.

Accordingly, such known pivot bolt assemblies must be routinely inspected for wear and such known pivot bolt assemblies often need to be replaced to avoid unwanted movement of the doors and to avoid complete failures of the pivot bolt assemblies which can cause the tops of the doors to become disconnected from the roof. The doors and the roofs must also be inspected and must also be sometimes repaired. These inspections, repairs and replacements are time consuming and expensive for the railroad industry.

Accordingly, there is a need for an improved railroad car door pivot bolt assembly.

SUMMARY

The present disclosure solves the above problems by providing an improved railroad car door pivot bolt assembly. The improved railroad car door pivot bolt assembly is configured to be easily and quickly installed on an existing railroad car to replace the current pivot bolt assembly without changing or substantially changing any of: the roof of the railroad car, the roof stiffener on the roof, the door of the railroad car, or the hood of the door of the railroad car. The present disclosure thereby provides a relatively inexpensive solution to the problems caused by the current commercially widely used pivot bolt assemblies, eliminates the need for the relatively expensive repairs of the railroad car doors and roofs, improves the movement of the railroad car doors, and reduces the time the railroad cars are out of service for inspection and repair or reconstruction. It should be appreciated that the present invention may be employed for doors on other railroad cars besides auto-rack railroad cars even though this disclosure primarily addresses auto-rack railroad car pivot bolt assemblies.

The railroad car door pivot bolt assembly of the present disclosure also provides a substantial advantage with respect to worn hoods. To install the railroad car door pivot bolt assembly of the present disclosure, preferably the hole in the hood is enlarged (such as by drilling) from its original diameter of ½ inch to a diameter of approximately ¾ of an inch. If the hood is worn such that the hole in the hood is less than or approximately equal to ¾ of an inch, the hood does not need to be replaced. This saves substantial time and money in costly repairs to the doors and particularly replacement of the hoods. In other words, the railroad car door pivot bolt assembly of the present disclosure reduces the number of hoods which need to be replaced.

In one embodiment, the railroad car door pivot bolt assembly includes a first bushing sized and configured to be positioned in the indentation or socket of the hood of the door, a second bushing sized and configured to be positioned in the cup defined by the roof stiffener, a shoulder bolt (configured to extend through the first bushing, the hood of the door, the second bushing, the roof stiffener, and the roof), a plurality of washers including a compression or thrust washer positionable on the shoulder bolt, and a nut attachable to the shoulder bolt. The second bushing includes a laterally extending member sized and configured to be positioned in the cup of the roof stiffener and a tubular inner member integrally connected to the laterally extending member. The tubular inner member is sized and configured to extend upwardly through the hood of the door and to engage an inner portion of the first bushing to provide a bushing-to-bushing engagement between the first bushing and the second bushing. This ties the hood of the door to the roof stiffener on the roof which substantially prevents the hood of the door of the auto-rack railroad car and the roof stiffener on the roof of the auto-rack railroad car from separately moving relative to each other. This substantially prevents wear on the shoulder bolt, and particularly wear to the shoulder bolt in or around the plane of the hood and wear to the shoulder bolt in or around the plane of the roof or roof stiffener.

In another embodiment, the railroad car door pivot bolt assembly includes a first bushing sized and configured to be positioned in the indentation or socket of the hood of the door, a cup liner or second bushing sized and configured to be positioned in the cup defined by the roof stiffener, a third bushing sized and configured to extend through the roof, roof stiffener, cup liner, hood of the door, and the first bushing, and a shoulder bolt (configured to extend through the first bushing, the hood of the door, the cup liner or second bushing, the roof stiffener, the roof, and the third bushing), a plurality of washers including a compression or thrust washer positionable on the shoulder bolt, and a nut attachable to the shoulder bolt. The third bushing includes a laterally extending member sized and configured to be positioned below the roof and a tubular inner member integrally connected to the laterally extending member. The tubular inner member is sized and configured to extend upwardly through the roof, roof stiffener, the cup liner or second bushing, the hood of the door, and the first bushing. The third bushing engages an inner portion of the cup liner or second bushing and thus provides a bushing-to-bushing engagement between the third bushing and the second bushing. The third bushing also engages an inner portion of the first bushing and thus provides a bushing-to-bushing engagement between the third bushing and the first bushing. This embodiment also ties the hood of the door to the roof stiffener on the roof which substantially prevents the hood of the door of the auto-rack railroad car and the roof stiffener on the roof of the auto-rack railroad car from separately moving relative to each other. This embodiment also substantially prevents wear on the shoulder bolt, and particularly wear on the shoulder bolt in or around the plane of the hood and wear on the shoulder bolt in or around the plane of the roof or roof stiffener.

Additional features and advantages are described herein, and will be apparent from, the following Detailed Description and the figures.

DETAILED DESCRIPTION

Figure 1:
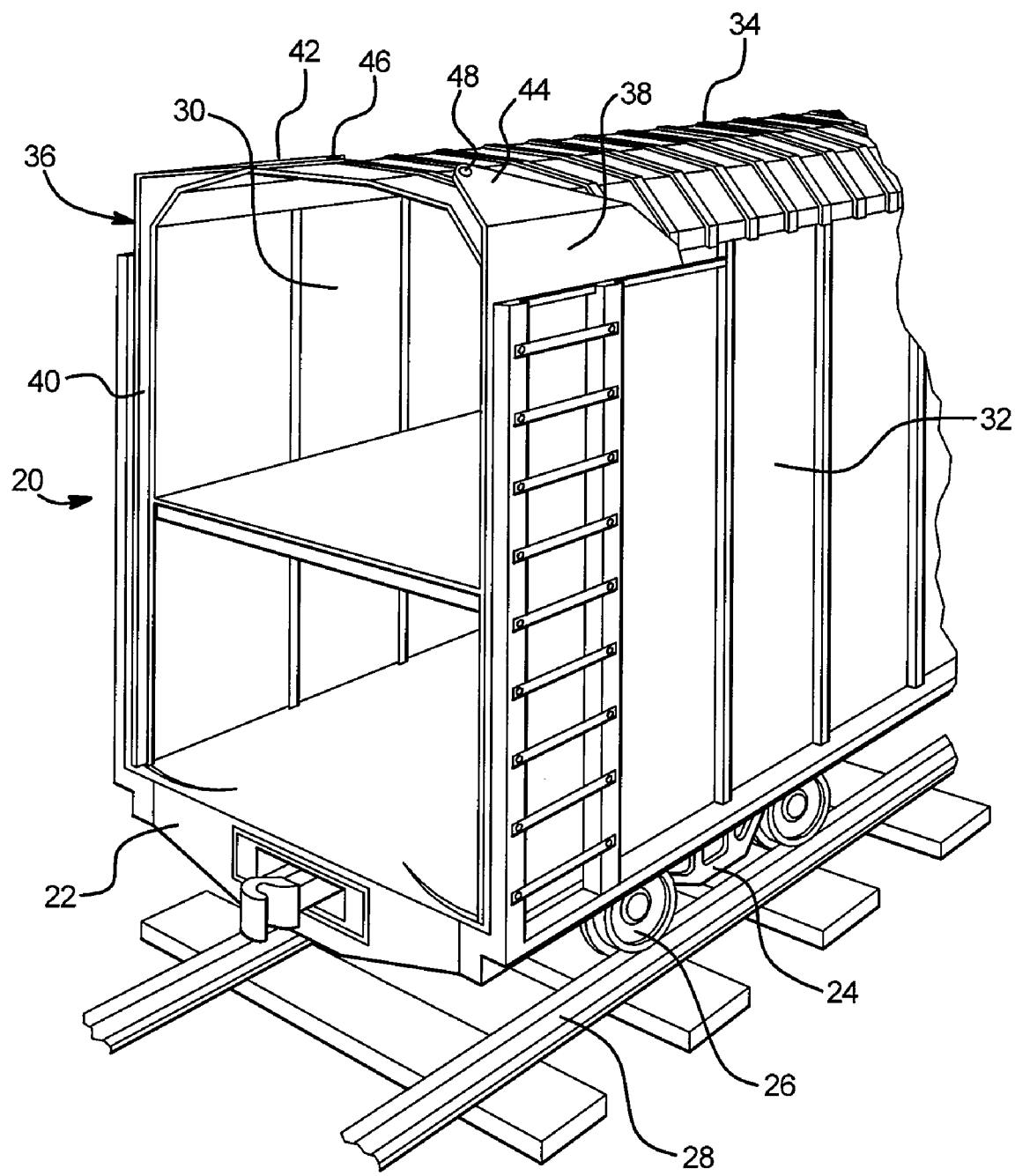
FIG. 1 is a fragmentary perspective view of a bi-level auto-rack railroad car illustrating the right and left hand doors at one end of the auto-rack railroad car.
Figure 2:
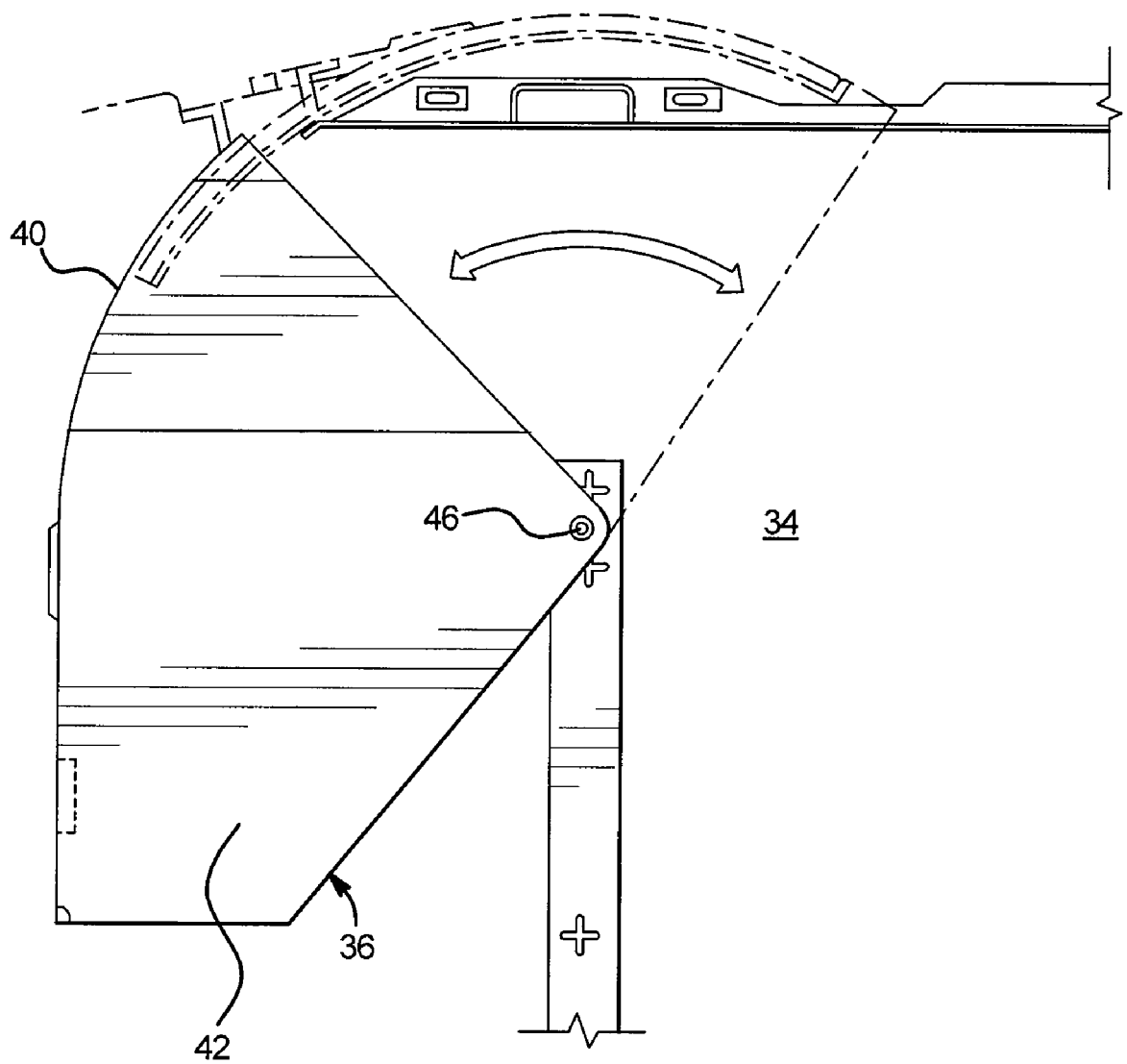
FIG. 2 is a fragmentary top view of the auto-rack railroad car of FIG. 1 illustrating the left hand door and the location of a known pivot bolt assembly attaching the door to the roof, and illustrating the movement of the door in phantom.
Figure 3:
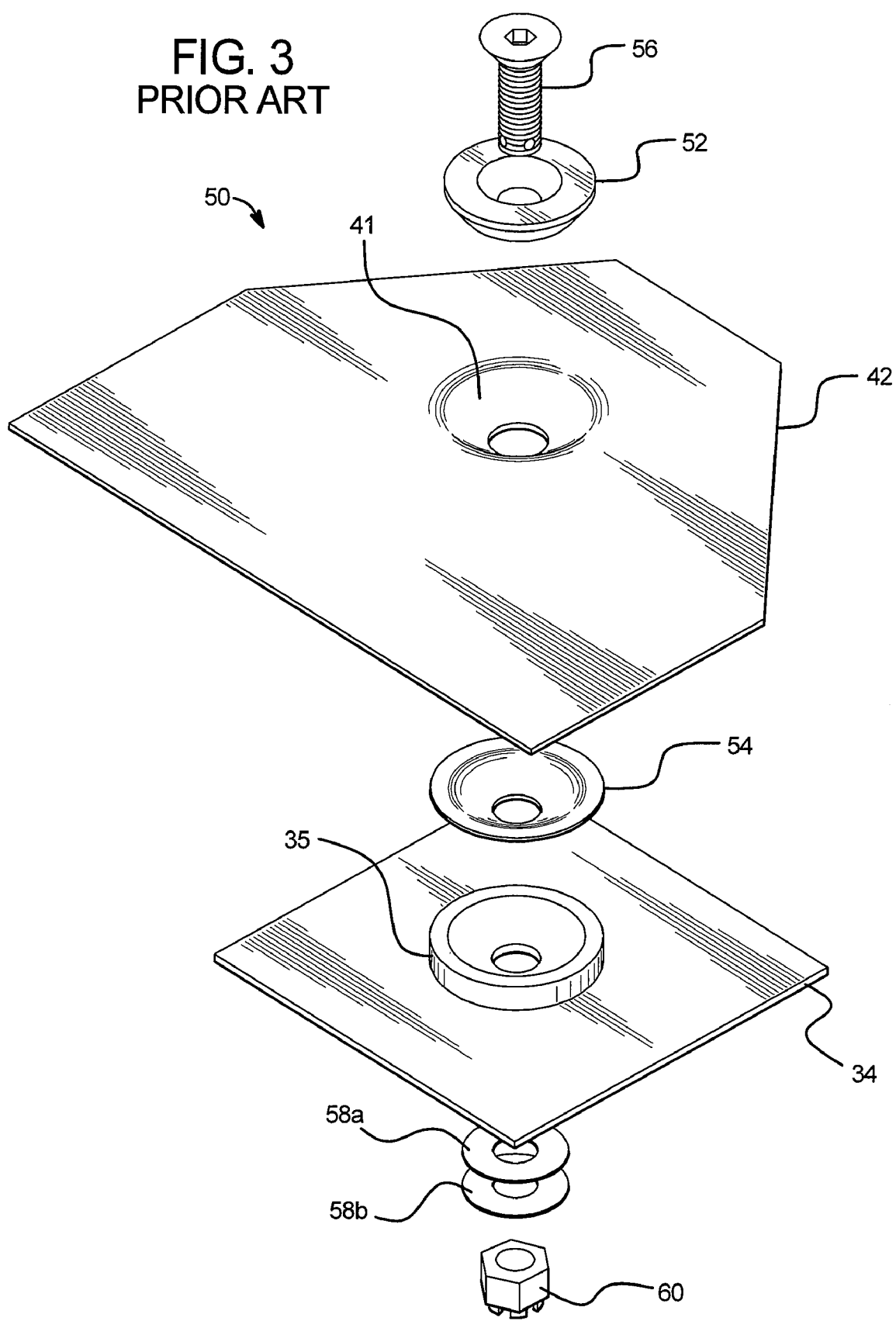
FIG. 3 is an exploded perspective view of the known pivot bolt assembly used to attach the door to the roof, and illustrating a portion of the hood of the door, a portion of the roof and the roof stiffener.
Figure 4:
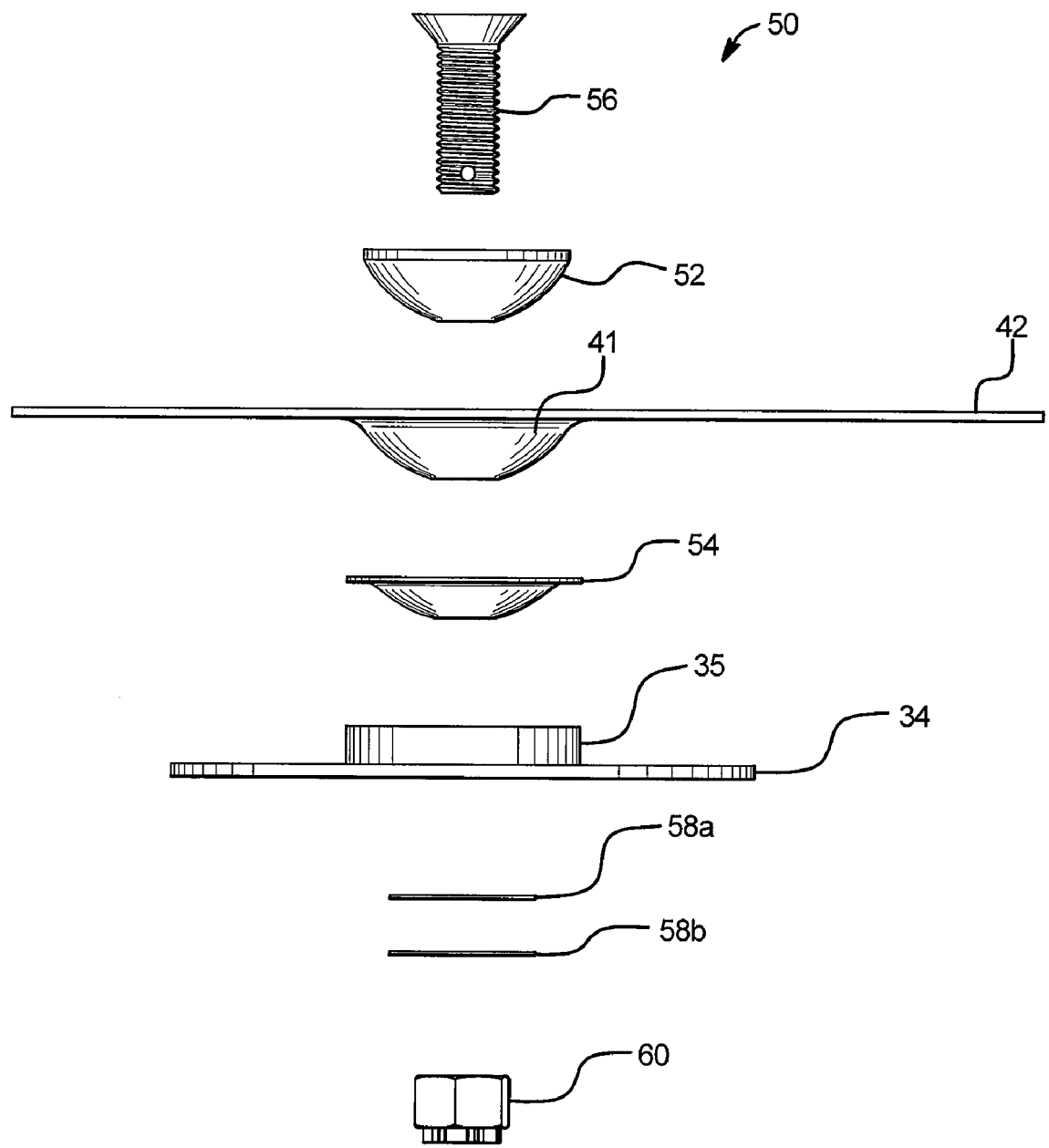
FIG. 4 is an exploded elevational view of the known pivot bolt assembly of FIG. 3 used to attach the door to the roof, and illustrating a portion of the hood of the door, a portion of the roof and the roof stiffener.
Figure 5:
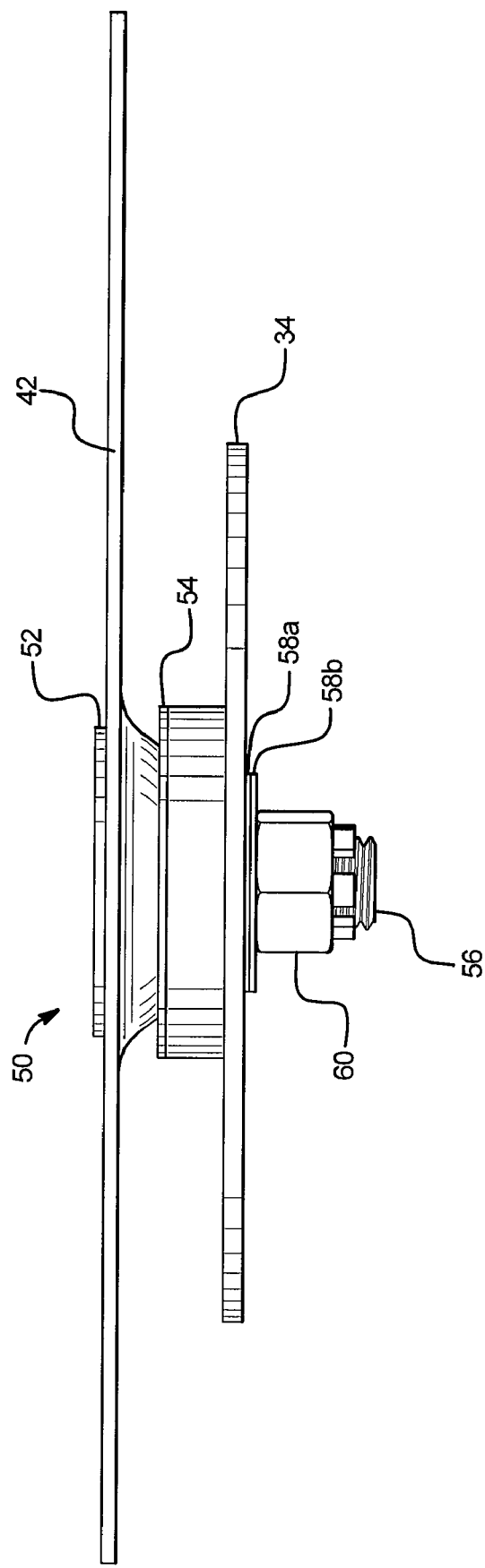
FIG. 5 is an elevational view of the known pivot bolt assembly used to attach the door to the roof, and illustrating a portion of the hood of the door, a portion of the roof and the roof stiffener.
Figure 6:
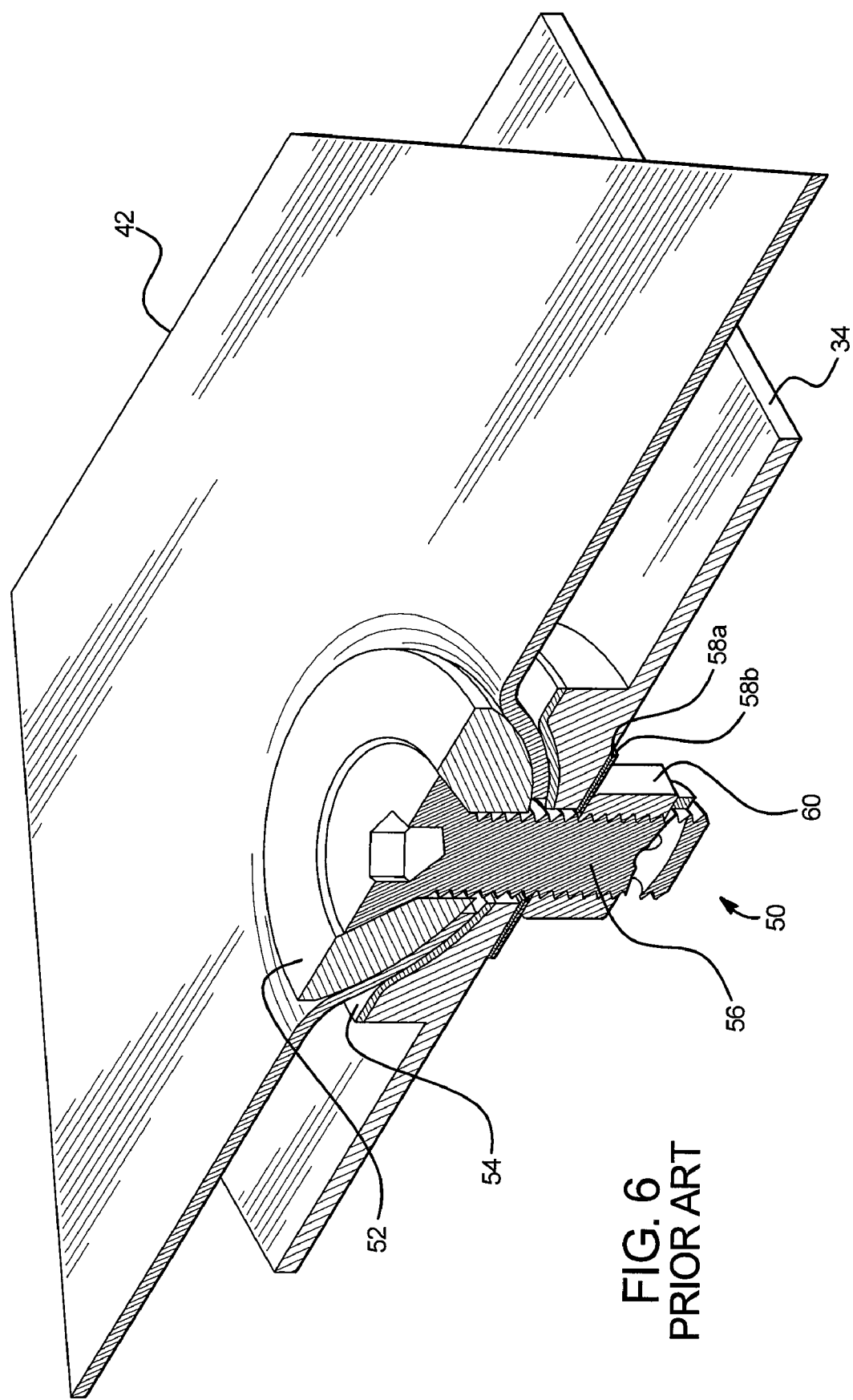
FIG. 6 is a cross-sectional perspective view of the known pivot bolt assembly used to attach the door to the roof, and illustrating a portion of the hood of the door, a portion of the roof and the roof stiffener.
Figure 7:
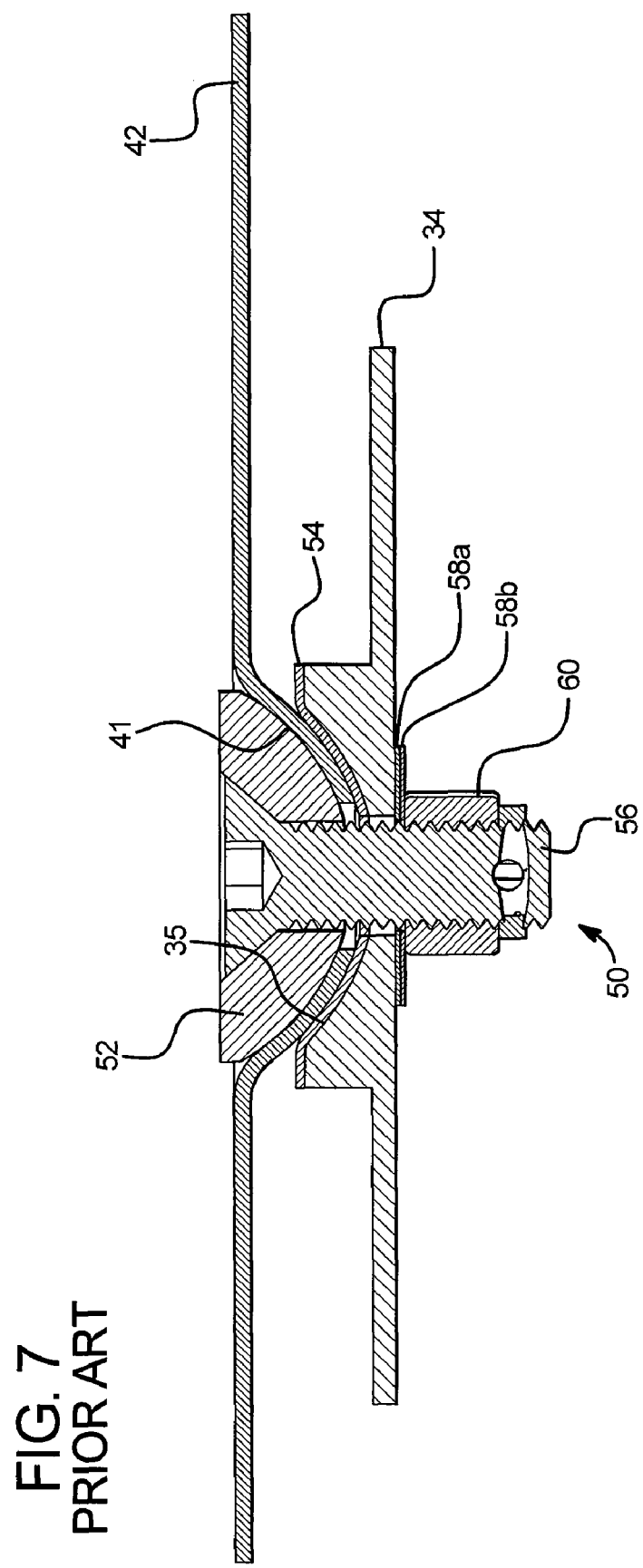
FIG. 7 is an elevational cross-sectional view of the known pivot bolt assembly used to attach the door to the roof, and illustrating a portion of the hood of the door, a portion of the roof and the roof stiffener.
Figure 8:
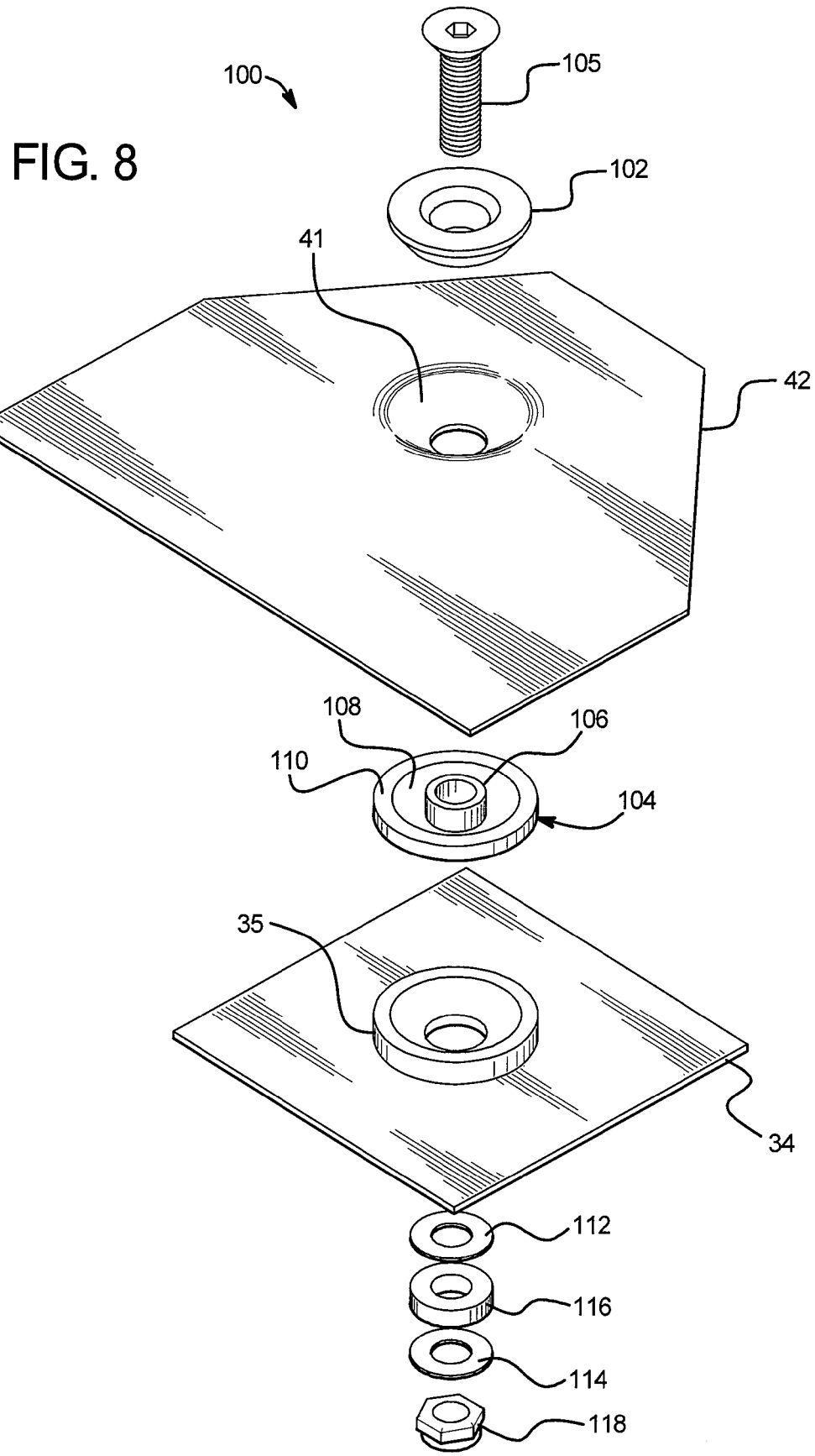
FIG. 8 is an exploded perspective view of a railroad car door pivot bolt assembly of one embodiment of the present disclosure for attaching a door to the roof of an auto-rack railroad car, and illustrated with respect to a portion of the hood of the door, a portion of the roof and the roof stiffener.
Figure 9:
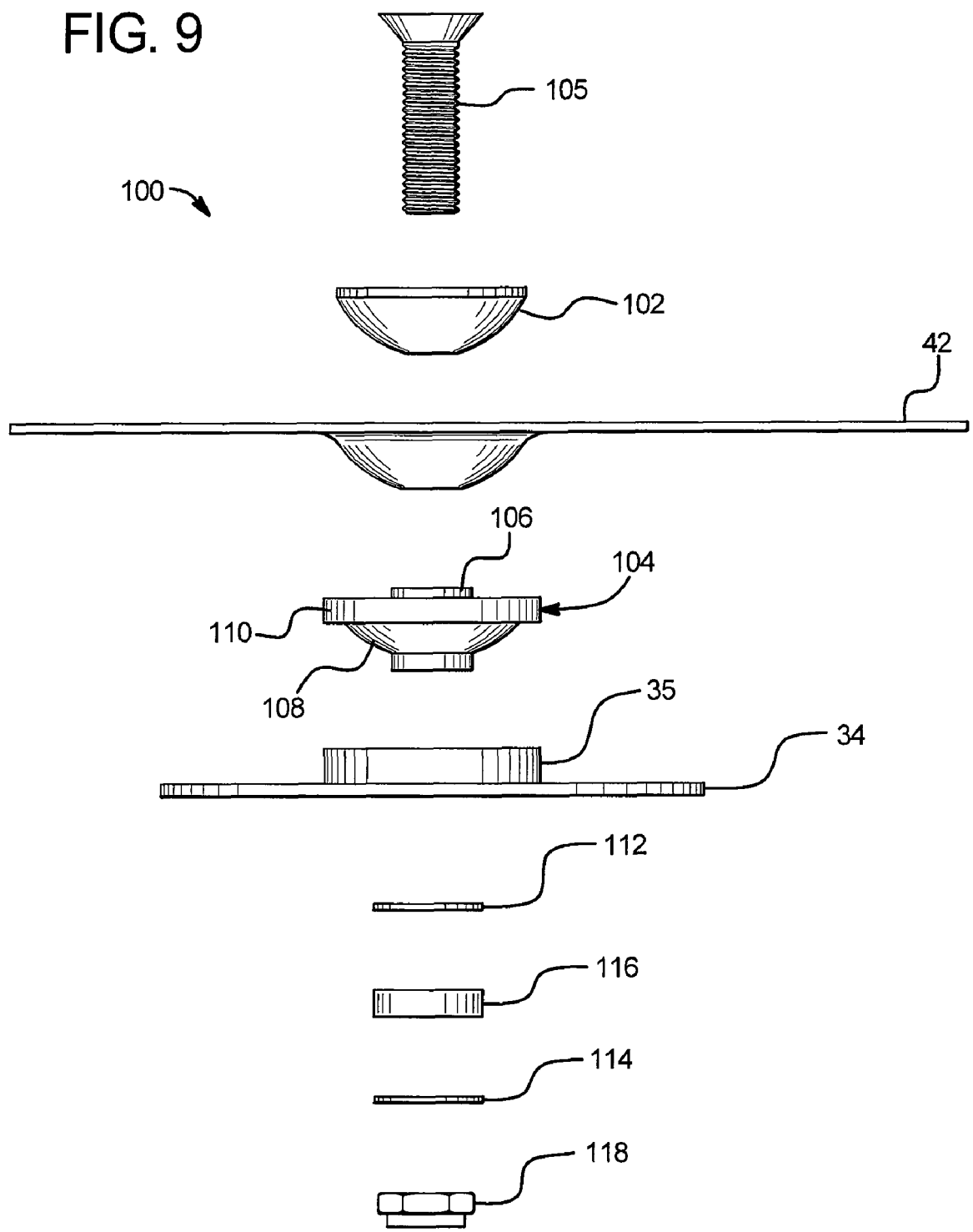
FIG. 9 is an exploded elevational view of the pivot bolt assembly of FIG. 8, and illustrated with respect to a portion of the hood of the door, a portion of the roof and the roof stiffener.
Figure 10:
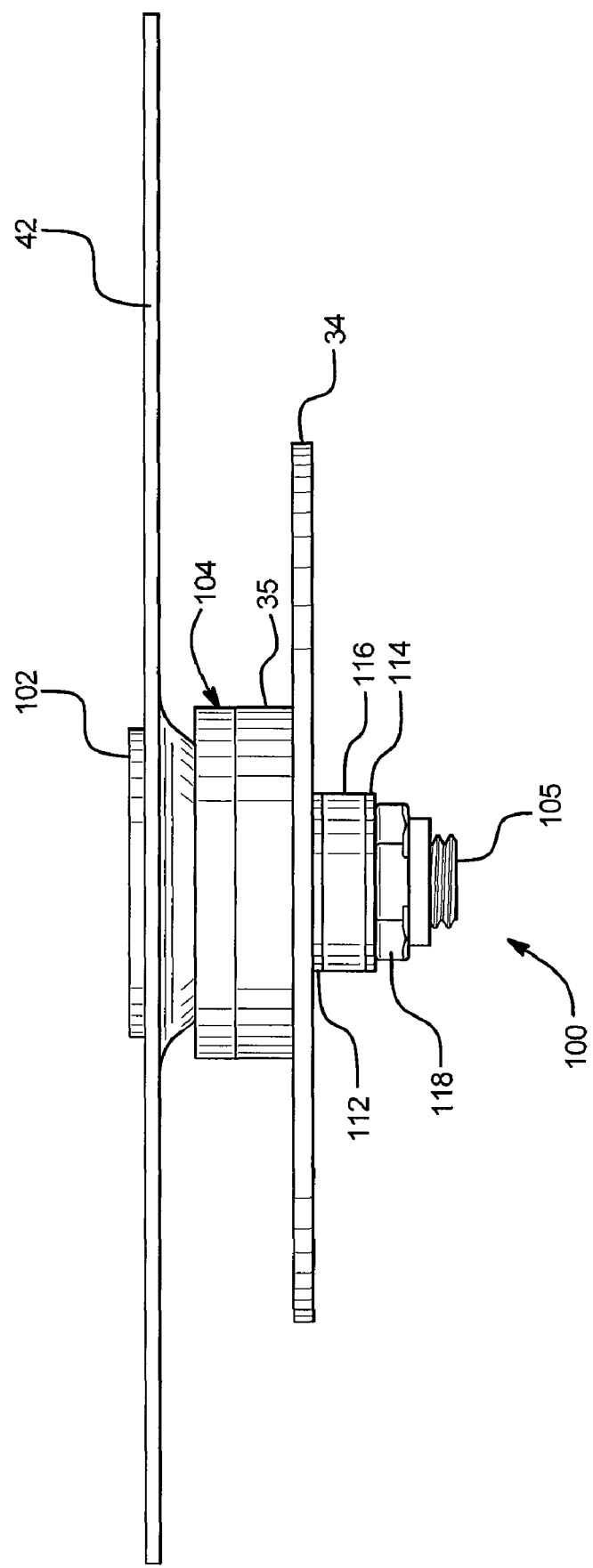
FIG. 10 is an elevational view of the pivot bolt assembly of FIG. 8, and illustrated mounted to a portion of the hood of the door, a portion of the roof and the roof stiffener.

Referring now to FIGS. 8 to 12, one embodiment of the railroad car door pivot assembly of the present disclosure is illustrated and generally indicated by numeral 100. The various embodiments of the railroad car door pivot assembly disclosed herein are sometimes referred to herein as the pivot assembly.

The illustrated embodiment of the railroad car door pivot assembly 100 generally includes: (a) a first bushing or ball socket 102 configured to be positioned in the socket or indentation 41 in the hood 42 of the door; (b) a second cup liner or lining bushing 104 configured to be positioned in the roof stiffener 35 on the roof 34; (c) a shoulder bolt 105 configured to extend through the first bushing 102, the hood 42 of the door, the second cup lining bushing 104, the roof stiffener 35 on the roof, and the roof 34; (d) a plurality of washers including washers 112 and 114 and a thrust or compression washer 116; and (e) a nut 118 attachable to the shoulder bolt 105. In one embodiment, the thrust or compression washer provides sufficient tension on the pivot bolt assembly even as one or more of the components thereof wear.

Figure 11:
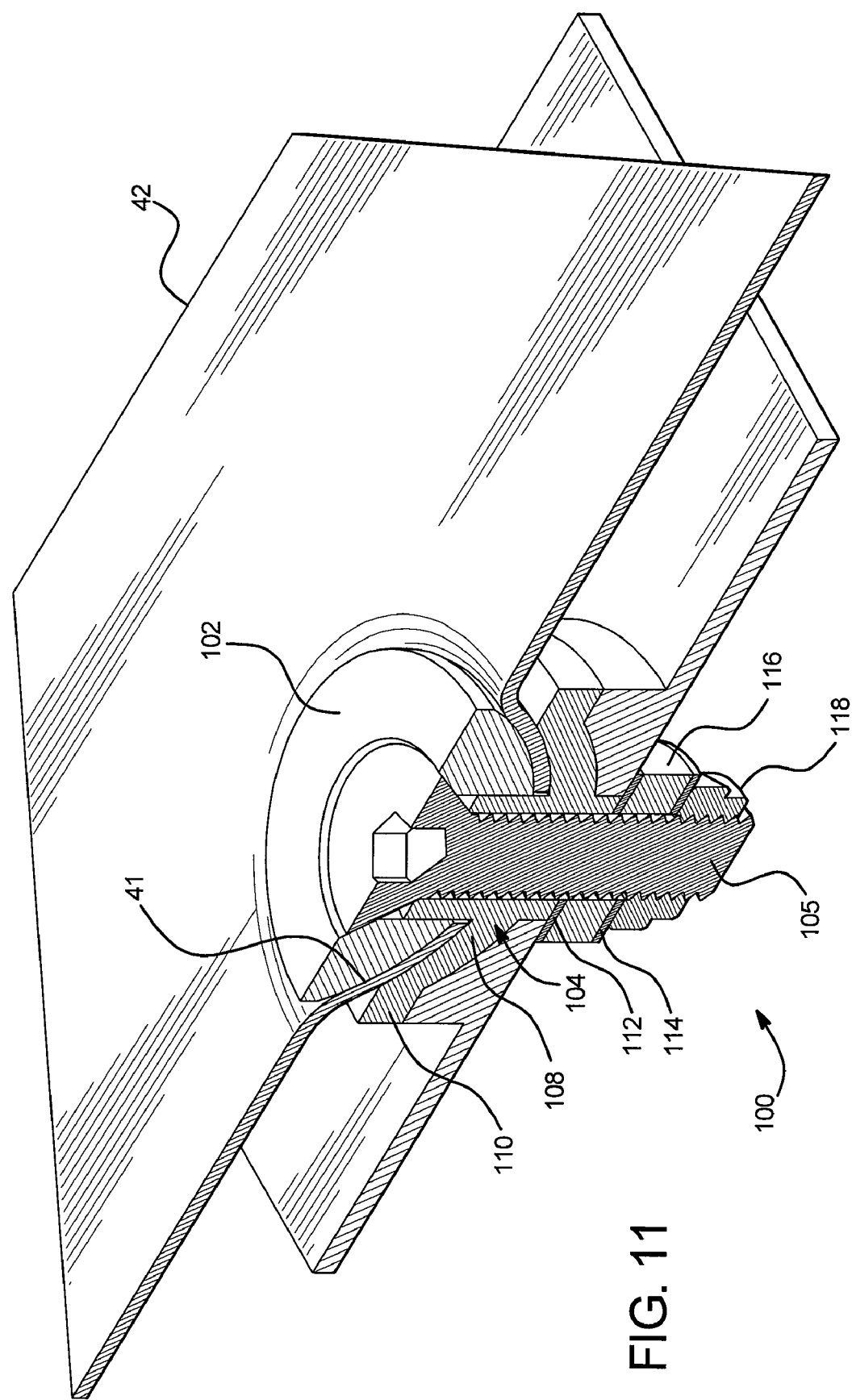
FIG. 11 is a cross-sectional perspective view of the pivot bolt assembly of FIG. 8, a portion of the hood of the door, a portion of the roof and the roof stiffener.
Figure 12:
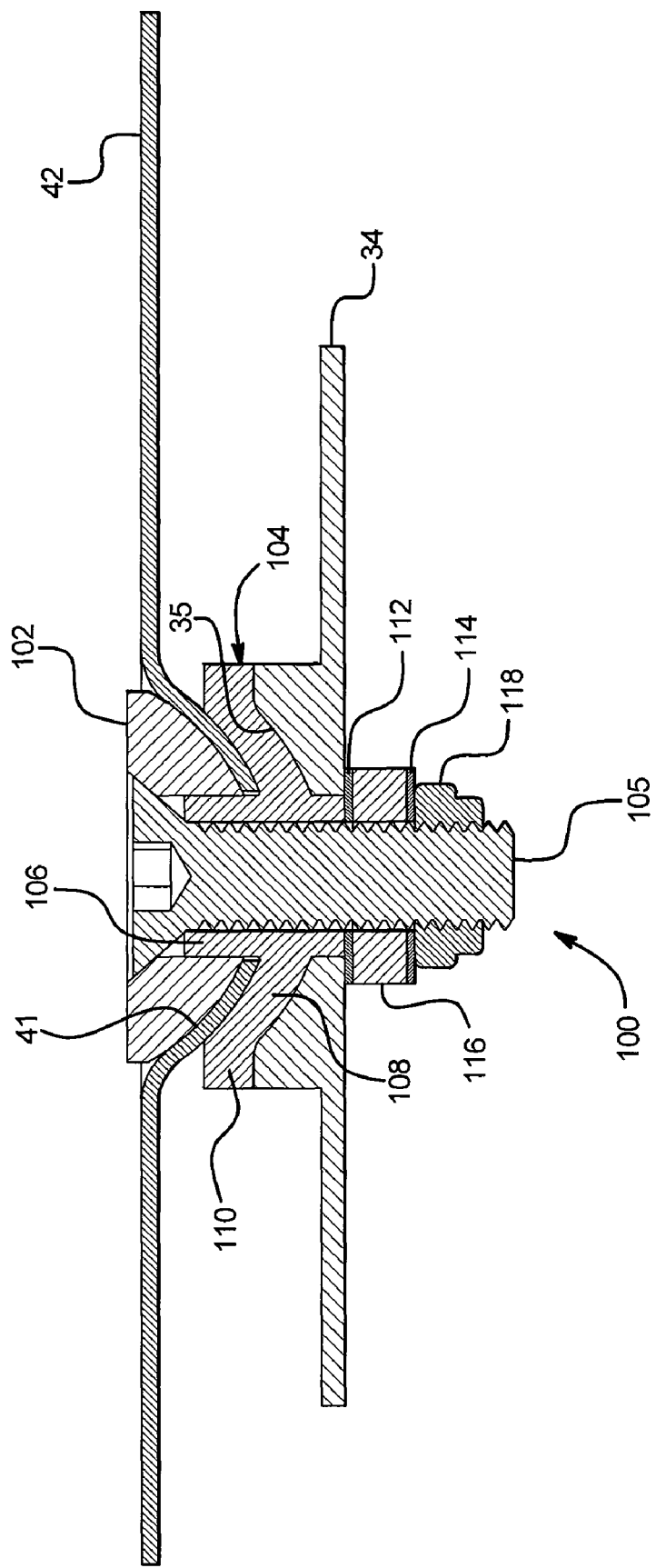
FIG. 12 is an elevational cross-sectional view of the pivot bolt assembly of FIG. 8, a portion of the hood of the door, a portion of the roof and the roof stiffener.
Figure 13:
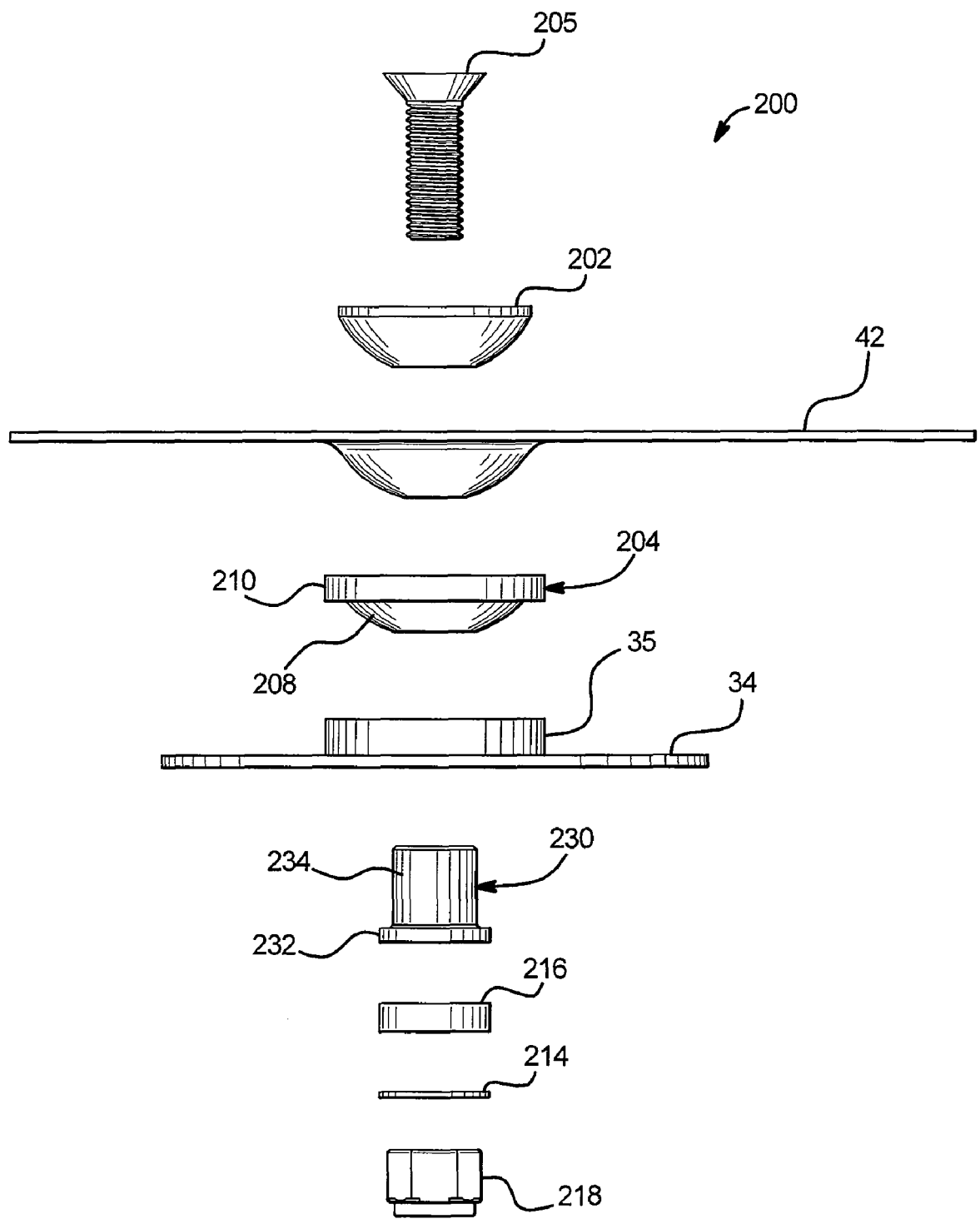
FIG. 13 is an exploded elevational view of a railroad car door pivot bolt assembly of another embodiment of the present disclosure for attaching a door to the roof of an autorack railroad car.
Figure 14:
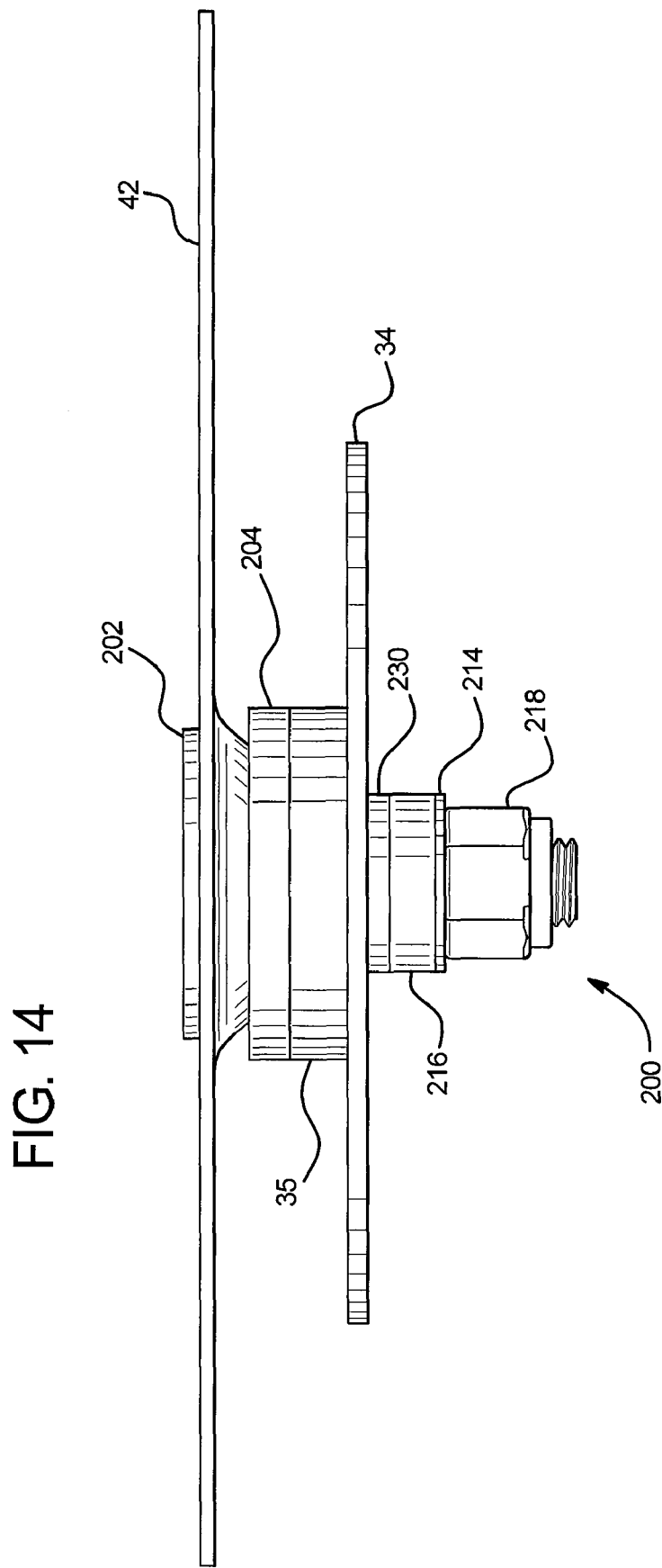
FIG. 14 is an elevational view of the pivot bolt assembly of FIG. 13 and illustrated mounted to a portion of the hood of the door, a portion of the roof and the roof stiffener.
Figure 15:
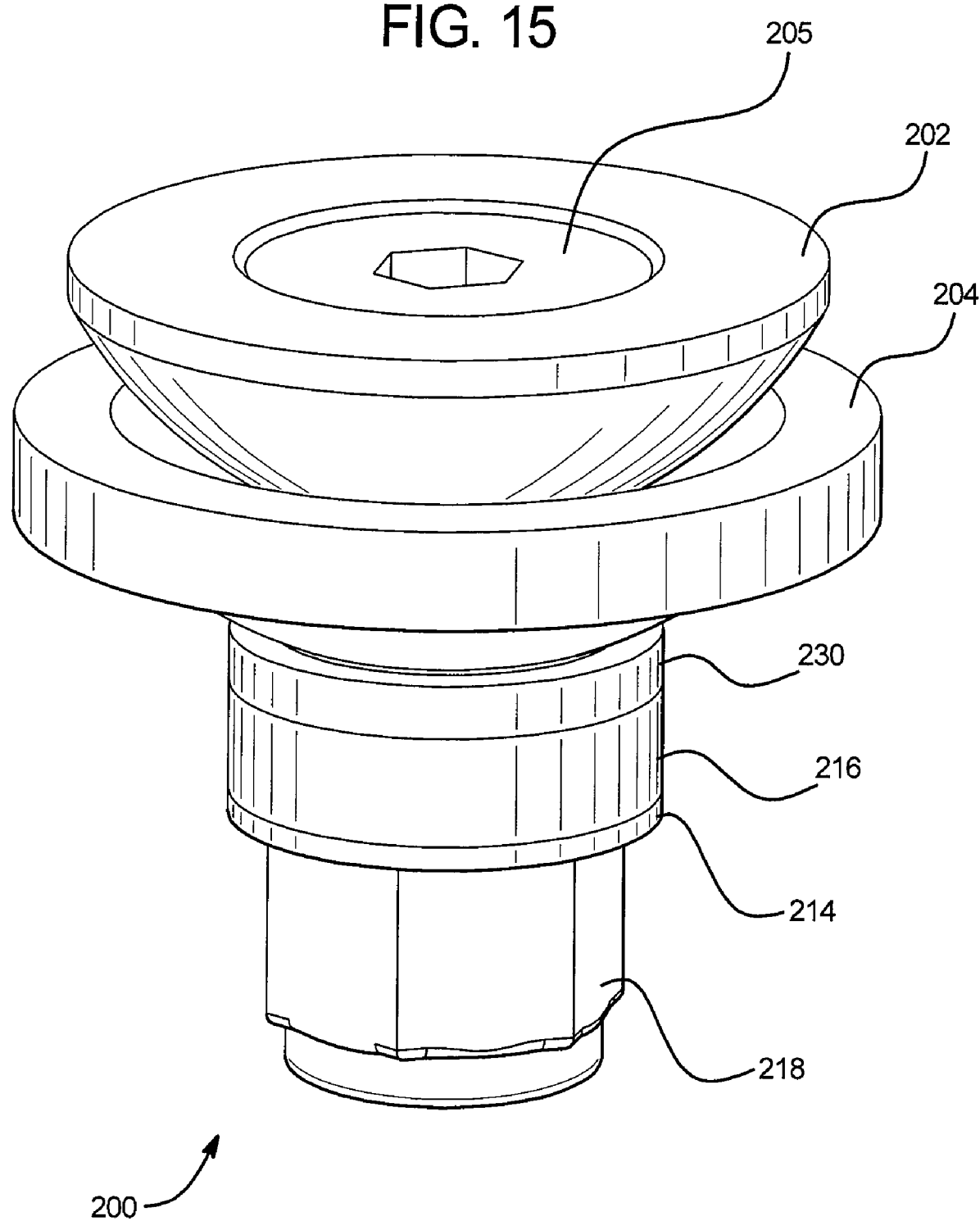
FIG. 15 is a perspective view of the pivot bolt assembly of FIG. 13.

One embodiment of the first bushing or ball socket 102 includes a semi-cylindrical or cup-shaped body configured to be positioned in the socket 41 defined by the hood 42 of the door. The first bushing 102 defines a central opening or aperture sized and configured to receive the shoulder bolt 105. The central opening is also sized and configured to receive an upper portion of the second bushing 104 as best illustrated in FIGS. 11 and 12 and as further discussed below.

The second bushing 104 includes a laterally extending member having a cup-shaped portion 108 and a cylindrical lip 110 extending from the cup-shaped portion 108. The cup shaped portion 108 is sized and configured to be positioned in the cup of the roof stiffener 35. The lip 110 is sized and configured to rest on the upper ledge of the roof stiffener 35. The second cup lining bushing 104 also includes a cylindrical tubular inner member 106 integrally connected to and extending upwardly from the laterally extending member. The cylindrical tubular inner member 106 defines a central opening or aperture sized and configured to receive the shoulder bolt 105. The cylindrical tubular inner member 106 is configured to extend through the hood 42 of the door and into the central opening or aperture of the first bushing 102 to engage the inner portion or surface of the first bushing 102 as best illustrated in FIGS. 11 and 12. This configuration of the second bushing 104 provides bushing-to-bushing contact or engagement between the first bushing 102 and the second bushing 104. This engagement between the first bushing 102 and the second bushing 104 functions to tie the hood 42 to the roof stiffener 35 to reduce or eliminate separate or undesired transverse movement of the hood 42 of the door relative to the roof stiffener 35 on the roof. This pivot bolt assembly 100 also enables the roof to flex vertically without detrimentally affecting the pivot bolt assembly 100. This reduces wear on the shoulder bolt 105 and other components of the pivot bolt assembly 100.

In the illustrated embodiment, the laterally extending member and particularly the cup-shaped portion and the cylindrical lip are substantially thicker than the cup liner of the known pivot bolt assembly illustrated in FIGS. 3 to 7. This provides more material which greatly extends the lifecycle of the assembly. This also provides a better engagement with the tubular member.

In the above embodiment, the first bushing and second bushing are each preferably molded from a ultra-violet ("UV") stabilized polymer such as a UV stabilized ultra-high molecular weight polyethylene, although it should be appreciated that they could be made in other suitable manners (such as by machining or injection molding) and from other suitable materials such as Delrin, urethane, moly disulfide filled nylon, manganese, bronze and ceramics. These bushings preferably each have a low coefficient of friction to steel, dry self-lubricating and non-hygroscopic characteristics, a high compressive strength and a high resistance to wear.

In the above embodiment, the compression washer is made from a low durometer urethane. It should be appreciated that the compression washer could be made from other suitable materials.

In the above embodiment, the shoulder bolt, nut and other washers are made from stainless steel. It should be appreciated that the shoulder bolt, nut and other washers can be made from other suitable materials. It should also be appreciated that the shoulder bolt could have an unthreaded shaft except for the end which the nut is attached to. It should also be appreciated that the bolt, washers and nut may be replaced with another suitable fastener assembly.

As discussed above, it should be appreciated that in one embodiment of the present disclosure, the holes in the hood of the door and/or the roof stiffener on the roof are made or reamed slightly larger to: (a) provide a suitably sized hole for the pivot bolt assembly; (b) facilitate more bushing bearing surface; and (c) clean any worn holes. The present disclosure this contemplates making the exiting holes larger such that the hood and/or roof stiffener do not need to be replaced even if they are worn to a certain degree.

It should be appreciated that the pivot bolt assembly disclosed herein is preferably used in connection with an end door stabilizer such as the ones shown in U.S. Patent Application Publication No. 2003/0221582 or suitable variations thereof.

Referring now to FIGS. 13 to 16, another embodiment of the railroad car door pivot bolt assembly of the present disclosure, generally indicated by number 200, is illustrated. This illustrated embodiment of the pivot assembly 200 generally includes: (a) a first bushing or ball socket 202 configured to be positioned in the socket or indentation 41 in the hood 42 of the door; (b) a cup liner or second bushing 204 configured to be positioned in the roof stiffener 35 on the roof 34; (c) a third bushing 230 configured to extend through the roof 34, the roof stiffener 35, the cup liner or second bushing 204, the hood 42, and the first bushing 202; (d) a shoulder bolt 205 configured to extend through the first bushing 202, the hood 42, the cup liner or second bushing 204, the roof stiffener 35, the roof 34 and the third bushing 230; and (e) a plurality of washers including washer 214 and a thrust or compression washer 216 and a nut 218 attachable to the shoulder bolt 205. In one embodiment, the thrust or compression washer provides sufficient tension on the pivot bolt assembly 200 even as on or more of the components thereof wear.

Figure 16:
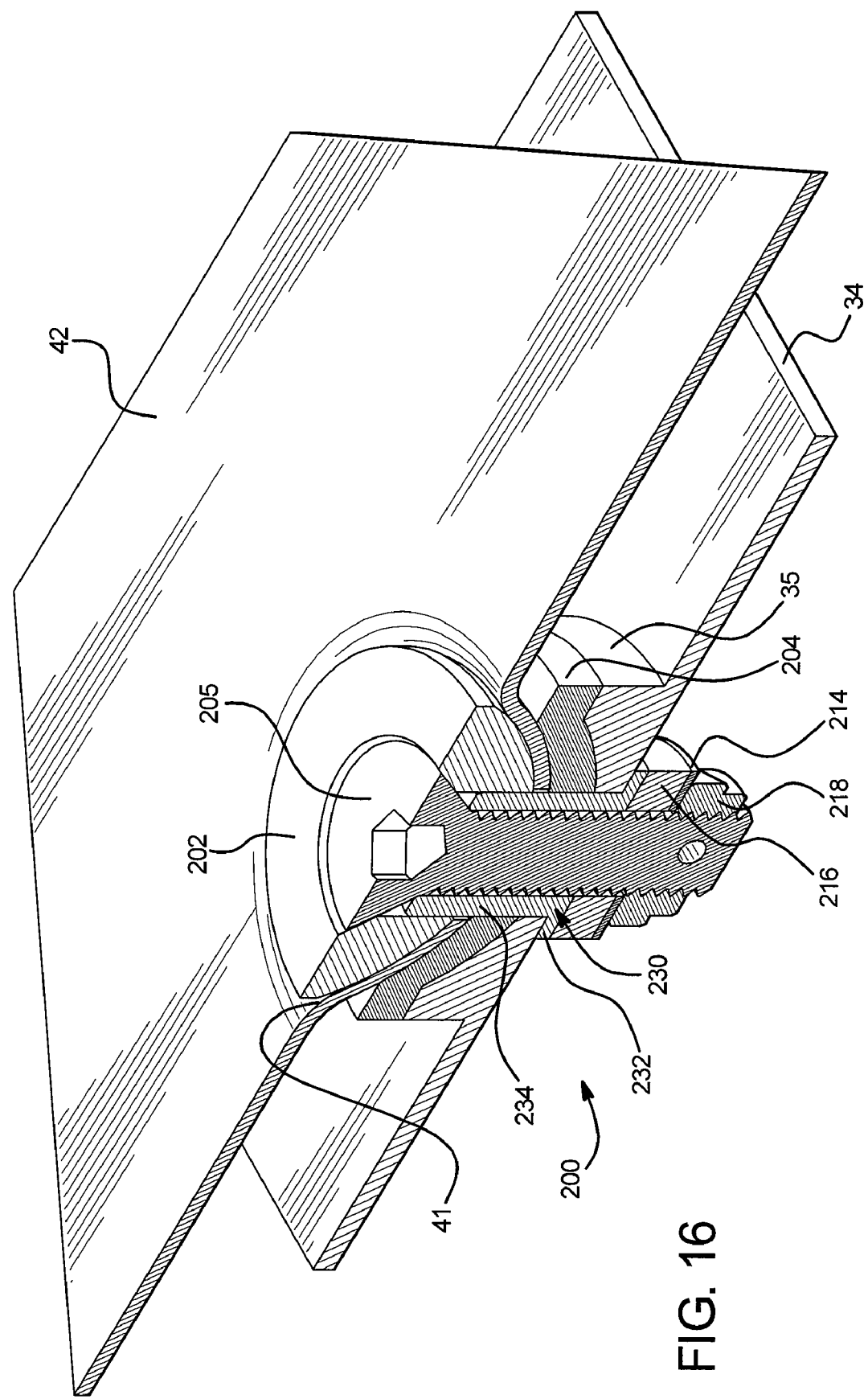
FIG. 16 is a cross-sectional perspective view of the pivot bolt assembly of FIG. 13, a portion of the hood of the door, a portion of the roof and the roof stiffener.

In this embodiment, the first bushing or ball socket 202 includes a semi-cylindrical or cup-shaped body configured to be positioned in the socket 41 defined by the hood 42 of the door. The first bushing 202 defines a central opening or aperture sized and configured to receive the bolt 205. The central opening is also sized and configured to receive an upper portion 234 of the third bushing 230 as best illustrated in FIG. 16 and as further discussed below.

The cup liner or second bushing 204 includes a laterally extending member having a cup-shaped portion 208 and a lip 210 extending from the cup-shaped portion 208. The cup shaped portion 208 is sized and configured to be positioned in the cup of the roof stiffener 35 and the lip 210 is sized to rest on the upper ledge of the roof stiffener 35. The second brushing defines a central opening or aperture sized and configured to receive the bolt 205.

The third bushing 230 includes a laterally extending member 232 and a cylindrical tubular inner member 234 integrally connected to and extending upwardly from the laterally extending member 232. The cylindrical tubular inner member 234 defines a central opening or aperture sized and configured to receive the bolt 205. The cylindrical tubular inner member 234 is configured to extend through roof 34, roof stiffener 35, cup liner 204, the hood 42 and into the central opening or aperture of the first bushing 202 to engage the inner portion or surface of the first bushing 202 and the inner portion or surface of the second bushing 204 as illustrated in FIG. 16. This configuration of the third bushing 230 provides a bushing-to-bushing contact or engagement between the first bushing and the third bushing, and between the second bushing and the third bushing. These engagements between the bushings functions to tie the hood 42 to the roof stiffener 35 to reduce or eliminate separate undesired transverse movement of the hood 42 relative to the roof stiffener 35. This pivot bolt assembly 200 also enables the roof 34 to flex vertically without detrimentally affecting the pivot bolt assembly 200. This reduces wear on the shoulder bolt 205 and other components of the pivot bolt assembly 200. This also reduces wear on the hood and roof/roof stiffener as described above.

As with the previous embodiment, in this illustrated embodiment, the laterally extending member 210 and particularly the cup-shaped portion 208 and the cylindrical lip are substantially thicker than the cup liner of the known pivot bolt assembly illustrated in FIGS. 3 to 7. This provides more material which greatly extends the lifecycle of the assembly. This also provides a better connection with the tubular member 234.

In this embodiment, the third bushing is made of a stainless steel. In the this embodiment, the first and second bushings are molded from a ultra-violet ("UV") stabilized polymer such as a UV stabilized ultra-high molecular weight polyethylene, although it should be appreciated that they could be made in other suitable manners (such as by machining or injection molding) and from other suitable materials such as Delrin, urethane, moly disulfide filled nylon, manganese, bronze and ceramics. The first and second bushings preferably each have a low coefficient of friction to steel, dry self-lubricating and non-hygroscopic characteristics, a high compressive strength and a high resistance to wear.

In this embodiment, the compression washer is made from a low durometer urethane. It should be appreciated that the compression washer could be made from other suitable materials.

In this embodiment, the shoulder bolt, nut and washer are made from stainless steel. It should be appreciated that the shoulder bolt, nut and washer can be made from other suitable materials. It should also be appreciated that the shoulder bolt could have an unthreaded shaft except for the end which the nut is attached to. In one embodiment, the nut is a nylon insert stop nut. It should also be appreciated that the bolt, washers and nut may be replaced with another suitable fastener assembly.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An auto-rack railroad car door pivot bolt assembly comprising:
   a first bushing sized and configured to be positioned in a socket of a hood of a door of an auto-rack railroad car, said first bushing defining a first aperture;
   a second bushing sized and configured to be positioned in a roof stiffener on a roof of the auto-rack railroad car, said second bushing including a cup shaped portion and a lip extending from the cup-shaped portion, said lip sized and configured to be positioned on an upper ledge of the roof stiffener, said cup shaped portion defining a second aperture;
   a third bushing including:
      (a) a laterally extending member sized and configured to be positioned under the roof and the roof stiffener on the roof of the auto-rack railroad car, and
      (b) a tubular inner member integrally connected to the laterally extending member, said laterally extending member and said tubular member defining a third aperture, said tubular inner member configured to extend upwardly through the roof, the roof stiffener, the second aperture of the second bushing, the hood of the door, and the first aperture of the first bushing when the second bushing is positioned in the roof stiffener and the first bushing is positioned in the socket of the hood, such that:
         (i) the tubular inner member engages an inner surface which defines the first aperture of the first bushing to provide a bushing-to-bushing engagement between the first bushing and the third bushing to tie the hood of the door of the auto-rack railroad car to the roof stiffener on the roof of the auto-rack railroad car, and
         (ii) the tubular inner member engages an inner surface which defines the second aperture of the second bushing to provide bushing-to-bushing engagement between the second bushing and the third bushing to further tie the hood of the door of the auto-rack railroad car to the roof stiffener on the roof of the auto-rack railroad car; and
   a fastener assembly configured to connect the first bushing, the second bushing, and the third bushing to the hood, the roof stiffener, and the roof.

2. The auto-rack railroad car door pivot bolt assembly of claim 1, wherein the fastener assembly includes a compression washer.

3. The auto-rack railroad car door pivot bolt assembly of claim 2, wherein the compression washer is made from a low durometer urethane.

4. The auto-rack railroad car door pivot bolt assembly of claim 1, wherein the fastener assembly includes a shoulder bolt, a compression washer, and a nut.

5. The auto-rack railroad car door pivot bolt assembly of claim 1, wherein the third bushing is made from a stainless steel and the first and the second bushings are made from UV stabilized high molecular weight polyethylene.

6. An auto-rack railroad car door pivot bolt assembly comprising:
   a UV stabilized high molecular weight polyethylene first bushing defining a first aperture;
   a UV stabilized high molecular weight polyethylene second bushing including a cup shaped portion and a lip extending from the cup-shaped portion, said cup shaped portion defining a second aperture;
   a stainless steel third bushing including a laterally extending member and a tubular inner member integrally connected to the laterally extending member, said laterally extending member and said tubular member defining a third aperture, said tubular inner member configured to extend through the second aperture of the second bushing and through the first aperture of the first bushing;
   a shoulder bolt configured to extend through the first bushing, second bushing and third bushing;
   a low durometer urethane compression washer configured to be positioned on the shoulder bolt;
   a washer configured to be positioned on the shoulder bolt; and
   a nut configured to be attached to the shoulder bolt.

7. An auto-rack railroad car door pivot bolt assembly comprising:
   a first bushing sized and configured to be positioned in a socket of a hood of a door of an auto-rack railroad car, said first bushing having an inner portion defining a first aperture;
   a second bushing configured to be positioned in a roof stiffener on a roof of said auto-rack railroad car, said second bushing including:
      (a) a laterally extending member having a cup-shaped portion sized and configured to be positioned in a cup of the roof stiffener, and a lip extending from the cup-shaped portion and sized and configured to be positioned on an upper surface of a ledge of the roof stiffener, and
      (b) a tubular inner member integrally connected to the laterally extending member, said tubular inner member configured to extend upwardly through the hood of the door when the cup-shaped portion is positioned in the cup of the roof stiffener and into the first aperture defined by the first bushing when the first bushing is in the socket, such that the tubular inner member engages an inner portion which defines the first aperture of the first bushing to provide a bushing-to-bushing engagement between the first bushing and the second bushing to tie the hood of the door of the auto-rack railroad car to the roof stiffener on the roof of the auto-rack railroad car;
   a shoulder bolt configured to extend through the aperture of the first bushing, the hood, the tubular inner member of the second bushing, the roof stiffener, and the roof;
   a compression washer positionable on the shoulder bolt below the roof; and
   a nut attachable to the shoulder bolt.

8. The auto-rack railroad car door pivot bolt assembly of claim 7, wherein the compression washer is made from a low durometer urethane.

9. The auto-rack railroad car door pivot bolt assembly of claim 7, wherein the first and the second bushings are made from a UV stabilized high molecular weight polyethylene.

10. An auto-rack railroad car door pivot bolt assembly comprising:
    a first bushing sized and configured to be positioned in a socket of a hood of a door of an auto-rack railroad car, said first bushing defining a first aperture;
    a second bushing sized and configured to be positioned in a roof stiffener on a roof of the auto-rack railroad car, said second bushing including a cup shaped portion and a lip extending from the cup-shaped portion, said lip sized and configured to be positioned on an upper ledge of the roof stiffener, said cup shaped portion defining a second aperture; and
    a third bushing including:
       (a) a laterally extending member sized and configured to be positioned under the roof and the roof stiffener on the roof of the auto-rack railroad car, and
       (b) a tubular inner member connected to the laterally extending member, said laterally extending member and said tubular member defining a third aperture, said tubular inner member configured to extend upwardly through the roof, the roof stiffener, the second aperture of the second bushing, the hood of the door, and the first aperture of the first bushing when the second bushing is positioned in the roof stiffener and the first bushing is positioned in the socket of the hood, such that:
          (i) the tubular inner member engages an inner surface which defines the first aperture of the first bushing to provide a bushing-to-bushing engagement between the first bushing and the third bushing to tie the hood of the door of the auto-rack railroad car to the roof stiffener on the roof of the auto-rack railroad car, and
          (ii) the tubular inner member engages an inner surface which defines the second aperture of the second bushing to provide bushing-to-bushing engagement between the second bushing and the third bushing to further tie the hood of the door of the auto-rack railroad car to the roof stiffener on the roof of the auto-rack railroad car;
    said first bushing, said second bushing, and said third bushing configured to be connected by a fastener assembly to the hood, the roof stiffener, and the roof.

11. The auto-rack railroad car door pivot bolt assembly of claim 10, wherein the third bushing is made from a stainless steel and the first and the second bushings are made from a UV stabilized high molecular weight polyethylene.

12. An auto-rack railroad car door pivot bolt assembly comprising:
    a UV stabilized high molecular weight polyethylene first bushing sized and configured to be positioned in a socket of a hood of a door of an auto-rack railroad car, said first bushing and defining a first aperture;
    a UV stabilized high molecular weight polyethylene second bushing configured to be positioned in a roof stiffener on a roof of said auto-rack railroad car, said second bushing including a cup shaped portion and a lip extending from the cup-shaped portion, said cup shaped portion defining a second aperture; and
    a stainless steel third bushing including a laterally extending member and a tubular inner member connected to the laterally extending member, said laterally extending member and said tubular member defining a third aperture, said tubular inner member configured to extend through the second aperture of the second bushing and through the first aperture of the first bushing;

said first bushing, said second bushing, and said third bushing configured to be connected by a fastener assembly to the hood, the roof stiffener, and the roof.

13. An auto-rack railroad car door pivot bolt assembly comprising:

a first bushing sized and configured to be positioned in a socket of a hood of a door of an auto-rack railroad car, said first bushing having an inner portion defining a first aperture; and a second bushing configured to be positioned in a roof stiffener on a roof of said auto-rack railroad car, said second bushing including:

(a) a laterally extending member having a cup-shaped portion sized and configured to be positioned in a cup of the roof stiffener, and a lip extending from the cup-shaped portion and sized and configured to be positioned on an upper surface of a ledge of the roof stiffener, and (b) a tubular inner member connected to the laterally extending member, said tubular inner member configured to extend upwardly through the hood of the door when the cup-shaped portion is positioned in the cup of the roof stiffener and into the first aperture defined by the first bushing when the first bushing is in the socket, such that the tubular inner member engages an inner portion which defines the first aperture of the first bushing to provide a bushing-to-bushing engagement between the first bushing and the second bushing to tie the hood of the door of the auto-rack railroad car to the roof stiffener on the roof of the auto-rack railroad car;

said first bushing and said second bushing configured to be connected by a fastener assembly to the hood, the roof stiffener, and the roof.

14. The auto-rack railroad car door pivot bolt assembly of claim 13, wherein the first and the second bushings are made from a UV stabilized high molecular weight polyethylene.

* * * * *